United States Patent
Le et al.

(10) Patent No.: US 8,446,897 B2
(45) Date of Patent: May 21, 2013

(54) SYSTEM AND METHOD FOR PROVIDING MULTIMEDIA TONE/ANNOUNCEMENT OVER WIRELESS NETWORK

(75) Inventors: Hyun Jeong Le, Yongin-si (KR); Joon Seo Lee, Suwon-si (KR); Sang Soo Chai, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2338 days.

(21) Appl. No.: 11/246,241

(22) Filed: Oct. 11, 2005

(65) Prior Publication Data
US 2006/0077990 A1  Apr. 13, 2006

(30) Foreign Application Priority Data
Oct. 12, 2004  (KR) .................. 10-2004-0081505

(51) Int. Cl.
*H04L 12/66* (2006.01)
*H04L 12/28* (2006.01)
*H04M 9/00* (2006.01)
*H04M 3/42* (2006.01)

(52) U.S. Cl.
USPC .......... 370/352; 370/356; 370/389; 370/392; 370/401; 455/401; 455/416

(58) Field of Classification Search
None
See application file for complete search history.

(56) References Cited

U.S. PATENT DOCUMENTS

| | | | |
|---|---|---|---|
| 6,392,999 B1 * | 5/2002 | Liu et al. | 370/260 |
| 6,515,695 B1 * | 2/2003 | Sato et al. | 348/14.08 |
| 2004/0048612 A1 * | 3/2004 | Virtanen et al. | 455/426.1 |
| 2004/0076145 A1 * | 4/2004 | Kauhanen et al. | 370/352 |
| 2004/0131048 A1 * | 7/2004 | Cook et al. | 370/352 |
| 2004/0174817 A1 * | 9/2004 | Jabri et al. | 370/238 |
| 2004/0190498 A1 * | 9/2004 | Kallio et al. | 370/352 |
| 2005/0157855 A1 * | 7/2005 | Pelaez et al. | 379/88.16 |
| 2005/0221793 A1 * | 10/2005 | Chin et al. | 455/401 |

FOREIGN PATENT DOCUMENTS

| | | |
|---|---|---|
| KR | 1999-0053972 | 7/1999 |
| KR | 1020030096146 A | 12/2003 |

* cited by examiner

*Primary Examiner* — Brandon Renner
(74) *Attorney, Agent, or Firm* — Roylance, Abrams, Berdo & Goodman, L.L.P.

(57) ABSTRACT

A system and method for providing a multimedia tone/announcement over circuit switched wireless networks are provided. The system and method enable processing of a multiple call leg function based on H.324M over a circuit switched wireless network by relaying an end-to-end H.324M initialization over the circuit switched wireless network. Therefore, a variety of multimedia services (for example, multimedia RBT/announcement service, video conferencing, etc.) together with video phone service based on H.324M in the circuit switched wireless network can be provided, which may be conducive to popularization of video phone service and realization of profits based on the provision of a variety of additional multimedia services.

21 Claims, 8 Drawing Sheets

SYSTEM AND METHOD FOR PROVIDING MULTIMEDIA TONE/ANNOUNCEMENT OVER WIRELESS NETWORK

CROSS-REFERENCE TO RELATED APPLICATION

This application claims benefits under 35 U.S.C. §119 from a Korean Patent Application Serial No. 10-2004-0081505 filed in the Korean Intellectual Property Office on Oct. 12, 2004 the entire disclosure of which is hereby incorporated by reference.

BACKGROUND OF THE INVENTION

1. Field of the Invention

The present invention relates to a system and method for providing a tone/announcement over a wireless network. More particularly, the present invention relates to a system and method for providing a multimedia tone (for example, a Ring Back Tone (RBT)) and a multimedia announcement for a video phone service based on H.324M in a circuit switched wireless network.

2. Description of the Related Art

In order to provide a multimedia service over a wireless network, IP based technologies (for example, SIP, H.323 and the like) are generally considered. However, an IPv4 network has not yet been optimized to process delay sensitive applications (for example, video phone, video conference, VOD, etc.) among services provided through a wireless link. Further, in an IPv4 network, it is not only difficult to transfer IP packets due to a high bit-error rate related to a wireless link, but there are insufficient IP addresses to assign to all of the IP-enabled mobile phones. Accordingly, provision of multimedia services using an IP network will be delayed. That is, before an IP backbone network supporting IPv6 and Quality of Service (QoS) is available, multimedia service provision via the IP network will be delayed.

Accordingly, it is expected that multimedia telephone services based on H.324M provided will be provided in circuit switched wireless networks.

H.324M is an end-to-end protocol which provides video phone service in a circuit switched wireless network. Although the H.324M can perform an end-to-end process between two H.324M terminals, it cannot provide a function to connect to another H.324M terminal (for example, a "multiple call leg") after end-to-end processing.

Therefore, the H.324M cannot support added service functions requiring the multiple call leg (for example, call transfer (CT), conference call (CC), call waiting (CW), etc.). Further, the H.324M cannot provide a variety of services such as a multimedia RBT/announcement which require an added service function related to a multiple call leg such as CT.

For example, in order to provide RBT/announcement services, first, the wireless network may have to perform end-to-end communication between a transmitting terminal and an RBT/announcement system, and then end-to-end communication between the transmitting terminal and a receiving terminal when the RBT/announcement ends. That is, in order to provide the RBT/announcement services, the wireless network must support the multiple call leg. However, current H.324M standard protocol cannot provide such a multiple call leg.

Accordingly, there is need for a separate method of providing a variety of multimedia services such as RBT/announcement, etc. for video phone service based on H.324M over a circuit switched wireless network.

SUMMARY OF THE INVENTION

It is an objective of the present invention to provide a method for processing a multiple call leg function based on H.324M in a circuit switched wireless network.

It is another objective to provide a method for relaying H.324M initialization between H.324M terminals in a circuit switched wireless network.

It is yet another objective to provide a method for providing an RBT/announcement service based on H.324M in a circuit switched wireless network.

According to an aspect of the present invention, there is provided a method for providing a tone/announcement over a circuit switched wireless network, comprising receiving a multimedia tone/announcement request message from a switch which determines to transmit the tone/announcement to a first terminal using the circuit switched wireless network, performing an initialization to open a channel between the first terminal and a server for providing a multimedia tone/announcement in response to the multimedia tone/announcement request, storing initialization information of the first terminal in the server for providing the multimedia tone/announcement, providing the first terminal with the multimedia tone/announcement, receiving a multimedia tone/announcement stop request message from the switch, stopping the multimedia tone/announcement in response to the multimedia tone/announcement stop request, and relaying the initialization information between the first terminal and a second terminal using the initialization information of the first terminal stored in advance in the server for providing the multimedia tone/announcement.

According to another aspect of the present invention, there is provided a system for providing a tone/announcement over a circuit switched wireless network, the system comprising an announcement manager for receiving a multimedia tone/announcement request message and a multimedia tone/announcement stop request message from a switch which determines to transmit the tone/announcement to a first terminal using the circuit switched wireless network, and controlling the system to transmit the multimedia tone/announcement according to the received message. The system further comprising an announcement processor for performing an initialization between the first terminal and the system by controlling the announcement manager, and relaying information to be transferred between the first terminal and a second terminal using the circuit switched wireless network service.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE EXEMPLARY EMBODIMENTS

Figure 1:
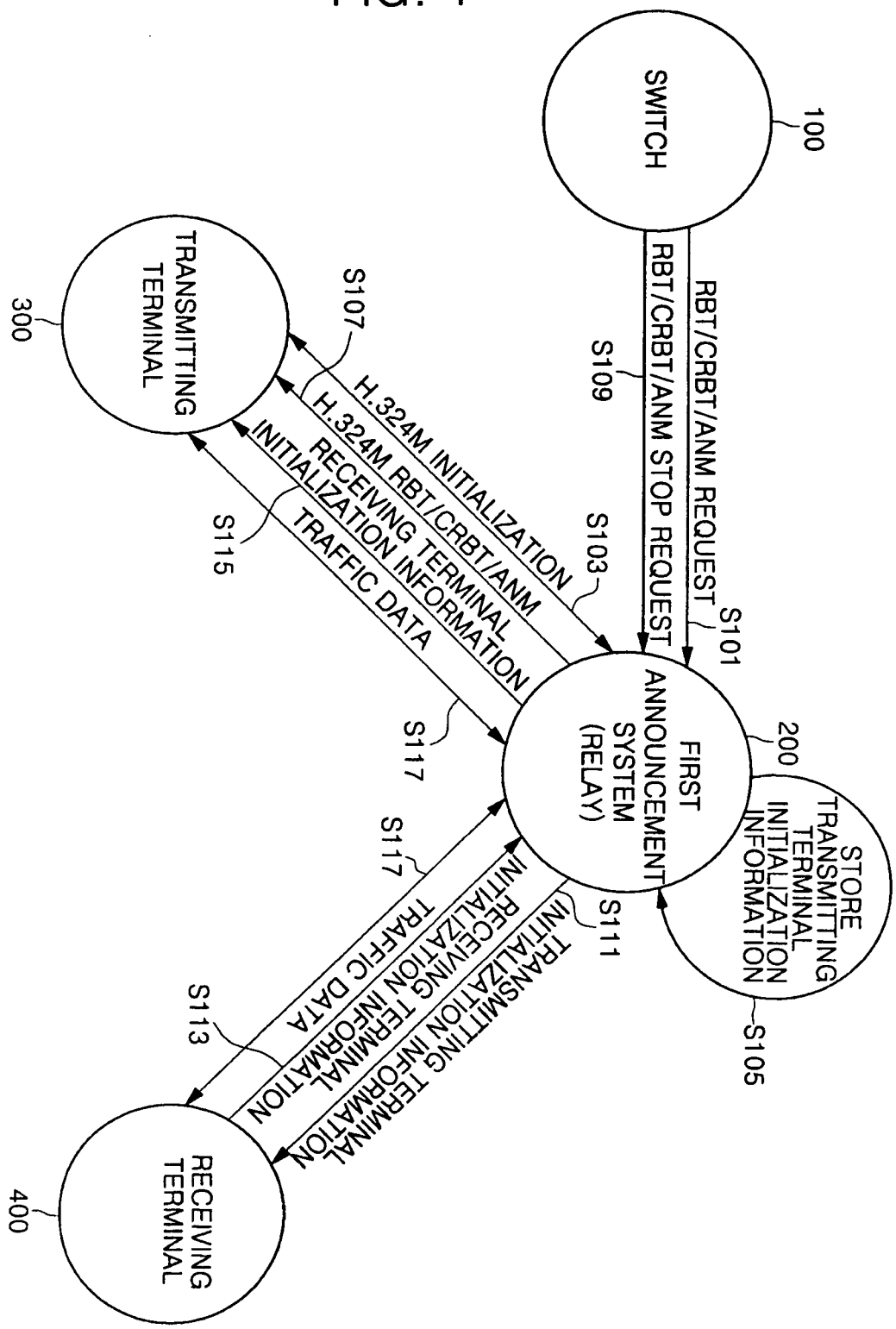
FIG. 1 is a view illustrating a concept of an operation of an announcement system in accordance with a first exemplary embodiment of the present invention.

The present invention will be described more fully hereinafter with reference to the accompanying drawings, in which exemplary embodiments of the invention are shown. This invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art. In the drawings, the thickness of layers and regions are exaggerated for clarity. Like reference numerals refer to like elements throughout the specification.

FIG. 1 is a view illustrating a concept of an operation of an announcement system in accordance with a first exemplary embodiment of the present invention. Referring to FIG. 1, an announcement system (hereinafter referred to as a "first announcement system") 200 in accordance with a first exemplary embodiment of the present invention initiates or terminates an RBT/Color RBT/announcement (hereinafter referred to as an RBT/CRBT/ANM) in response to a request from a switch 100, and relays initialization between a transmitting terminal 300 and a receiving terminal 400 when the RBT/CRBT/ANM is terminated.

Operating procedure of the first announcement system 200 will be described in detail below with reference to FIG. 1.

First, when a switch 100 (transmitting or receiving switch) requests an RBT/CRBT/ANM from a first announcement system 200 (S101) after receiving a call request from a transmitting terminal 300 and then determining that an RBT/announcement should be transmitted to a transmitting terminal 300, the first announcement system 200 performs an H.324M initialization process on the transmitting terminal 300 in order to provide the transmitting terminal 300 with the RBT/CRBT/ANM (S103).

Here, the H.324M initialization process performed between the transmitting terminal 300 and the first announcement system 200 is implemented according to a procedure defined in an H.324M standard. However, in accordance with the present invention, the first announcement system 200 further performs a process to store initialization information of the transmitting terminal 300 (S105) while performing the process of S103. This storing process is performed in order to relay initialization between the transmitting terminal 300 and the receiving terminal 400 after the RBT/CRBT/ANM is terminated at the request of the switch 100. Here, the stored initialization information of the transmitting terminal 300 includes, for example, capability of the transmitting terminal 300, multiplexing information (for example, video/voice codec information, multiplexing scheme, and so on), multiplexing capability, multiplexing table, and logical channel information.

When the H.324M initialization is completed between the transmitting terminal 300 and the first announcement system 200 in the process of S103, the first announcement system 200 provides the transmitting terminal 300 with the RBT/CRBT/ANM based on the H.324M standard (S107).

Meanwhile, when a call is established between the transmitting terminal 300 and the receiving terminal 400 on the basis of the call request of the transmitting terminal 300, the switch 100 requests the first announcement system 200 to stop the RBT/CRBT/ANM (S109). Then, the first announcement system 200 transfers the initialization information to the receiving terminal 400 (S111) while stopping the RBT/CRBT/ANM, receives the initialization information of the receiving terminal 400 from the receiving terminal 400 (S113) and transfers the initialization information to the transmitting terminal 300 (S115). That is, the first announcement system 200 relays the initialization information of the transmitting terminal 300 and the receiving terminal 400 between the transmitting terminal 300 and the receiving terminal 400.

Further, when a channel is formed between the transmitting terminal 300 and the receiving terminal 400 through the first announcement system 200 by exchanging the initialization information, the first announcement system 200 transfers traffic data between the transmitting terminal 300 and the receiving terminal 400 over the channel (S117). That is, the first announcement system 200 relays the traffic data between the transmitting terminal 300 and the receiving terminal 400.

According to an exemplary implementation of the present invention, the first announcement system 200 establishes a temporary storage area (for example, a stack, etc.) to store each type of information (for example, initialization information, traffic data, etc.) of all terminals related with the relay, and stores information to be relayed in the area.

Figure 2:
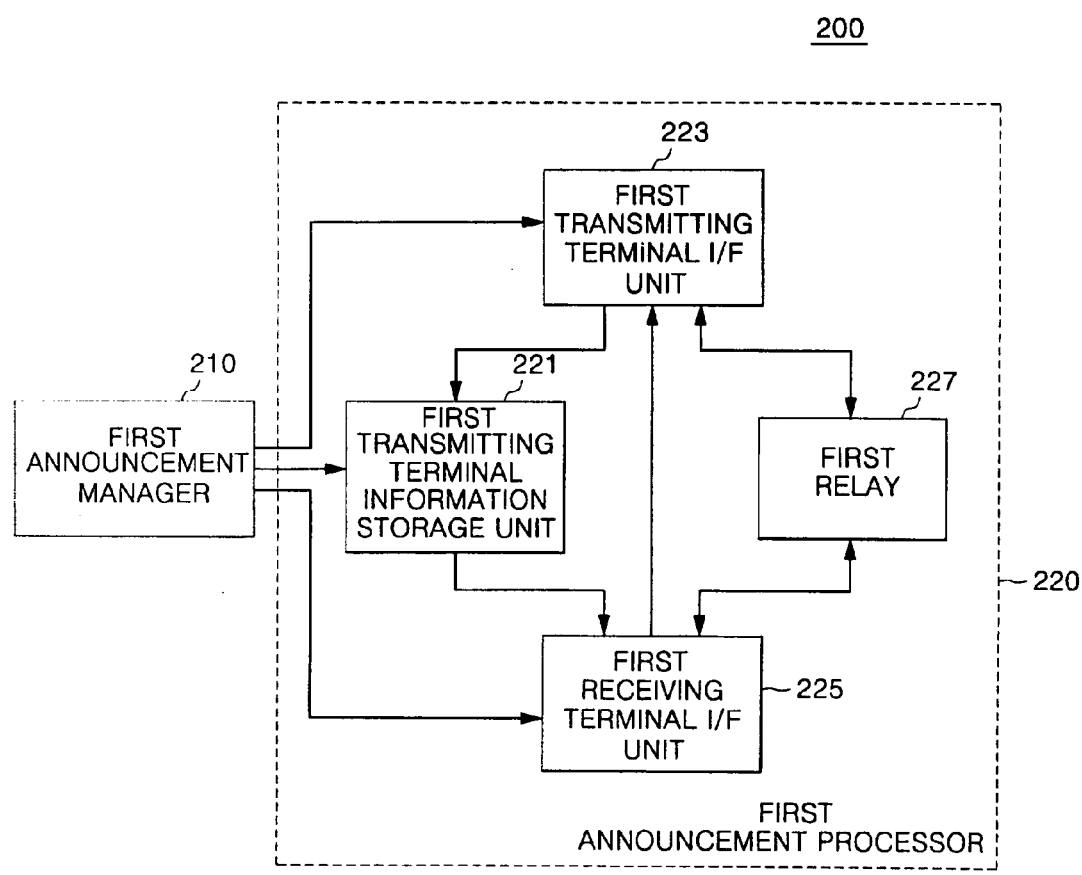
FIG. 2 is a schematic block diagram of an announcement system in accordance with a first exemplary embodiment of the present invention.

FIG. 2 is a schematic block diagram of an announcement system in accordance with a first exemplary embodiment of the present invention. Referring to FIG. 2, a first announcement system 200 in accordance with the first exemplary embodiment of the present invention includes a first announcement manager 210 and a first announcement processor 220.

The first announcement manager 210 receives an RBT/CRBT/ANM request and an RBT/CRBT/ANM stop request from an external source (for example, a switch) and controls operation of the first announcement processor 220 accordingly. For example, the first announcement manager 210 transfers RBT/CRBT/ANM initiation and termination commands to the first announcement processor 220 in response to the RBT/CRBT/ANM request and stop request, respectively.

The first announcement manager 210 provides the transmitting terminal with the RBT/CRBT/ANM by controlling the transmission or relaying the transmission between the transiting terminal and the receiving terminal. In an exemplary implementation, the first announcement processor 220 includes a first transmitting terminal information storage unit 221, a first transmitting terminal interface (I/F) 223, a first receiving terminal interface (I/F) 225, and a first relay 227. In another exemplary implementation, the first announcement processor 220 generates information on the basis of a RBT/CRBT/ANM initialization command of the first announcement manager 210.

The first transmitting terminal information storage unit 221 stores initialization information of the transmitting terminal transmitted to the announcement system on RBT/CRBT/ANM initialization between the transmitting terminal and the announcement system to receive the RBT/CRBT/ANM.

The first transmitting terminal I/F 223 enables the transmitting terminal to be interfaced, and the first receiving terminal I/F 225 enables the receiving terminal to be interfaced. Further, the first transmitting terminal I/F 223 and the first receiving terminal I/F 225 also store information to be exchanged between them.

According to an exemplary implementation, the first transmitting terminal information storage unit 221 and the first transmitting terminal I/F 223 are embodied as a stack (for example, an H.324M stack) corresponding to the transmitting terminal, and the first receiving terminal I/F 225 is embodied as a stack (for example, an H.324M) corresponding to the receiving terminal.

The first relay 227 relays information to be exchanged between the transmitting terminal and the receiving terminal between the first transmitting terminal I/F 223 and the first receiving terminal I/F 225. For example, the first relay 227 receives the traffic data to be transferred to the receiving terminal from the first transmitting terminal I/F 223 and transfers the traffic data to the first receiving terminal I/F 225, and receives the traffic data to be transferred to the transmitting terminal from the first receiving terminal I/F 225 and transfers the traffic data to the first transmitting terminal I/F 223.

Figure 3:
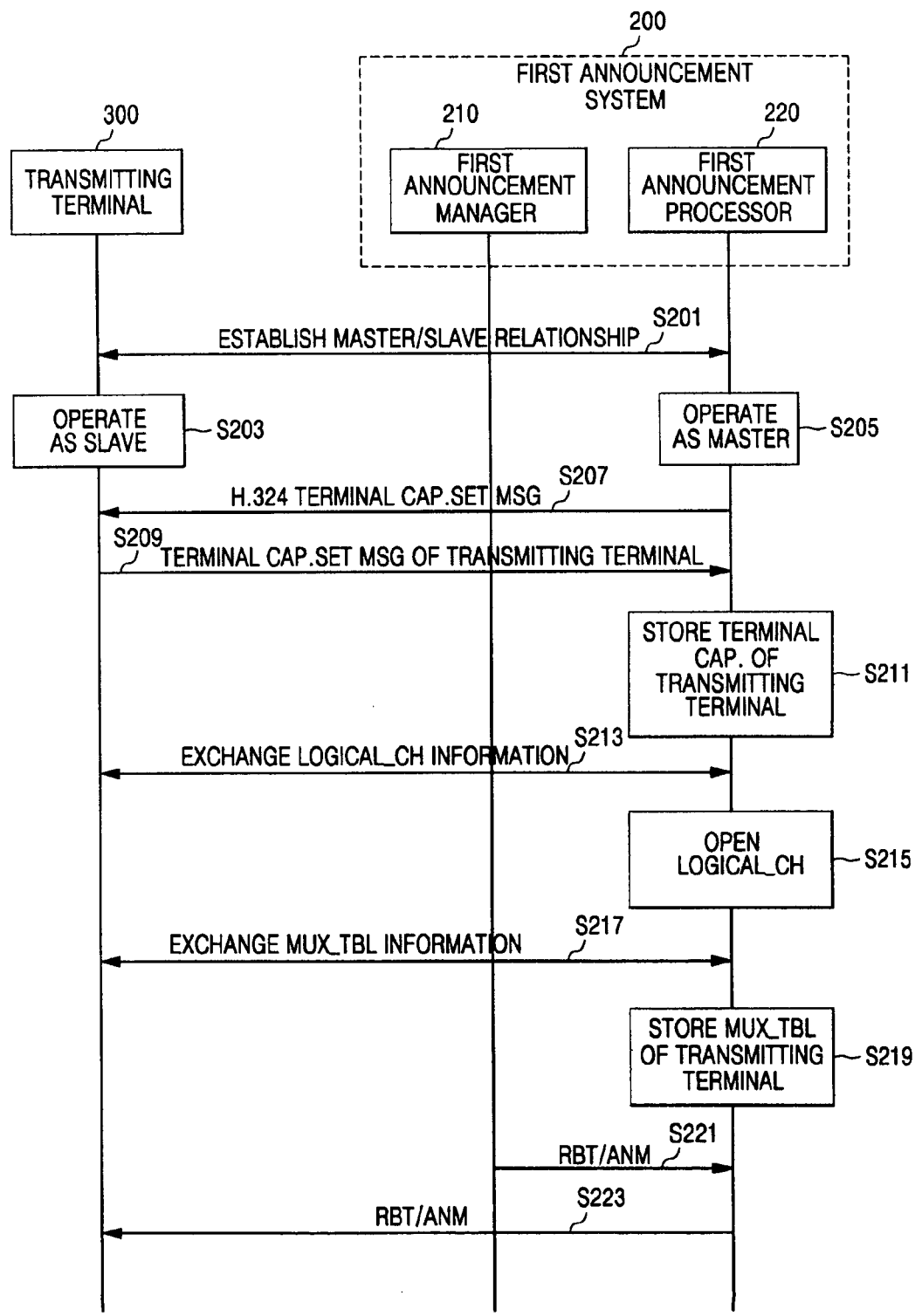
FIGS. 3 and 4 are views illustrating a multimedia tone/announcement process of an announcement system in accordance with a first exemplary embodiment of the present invention.
Figure 4:
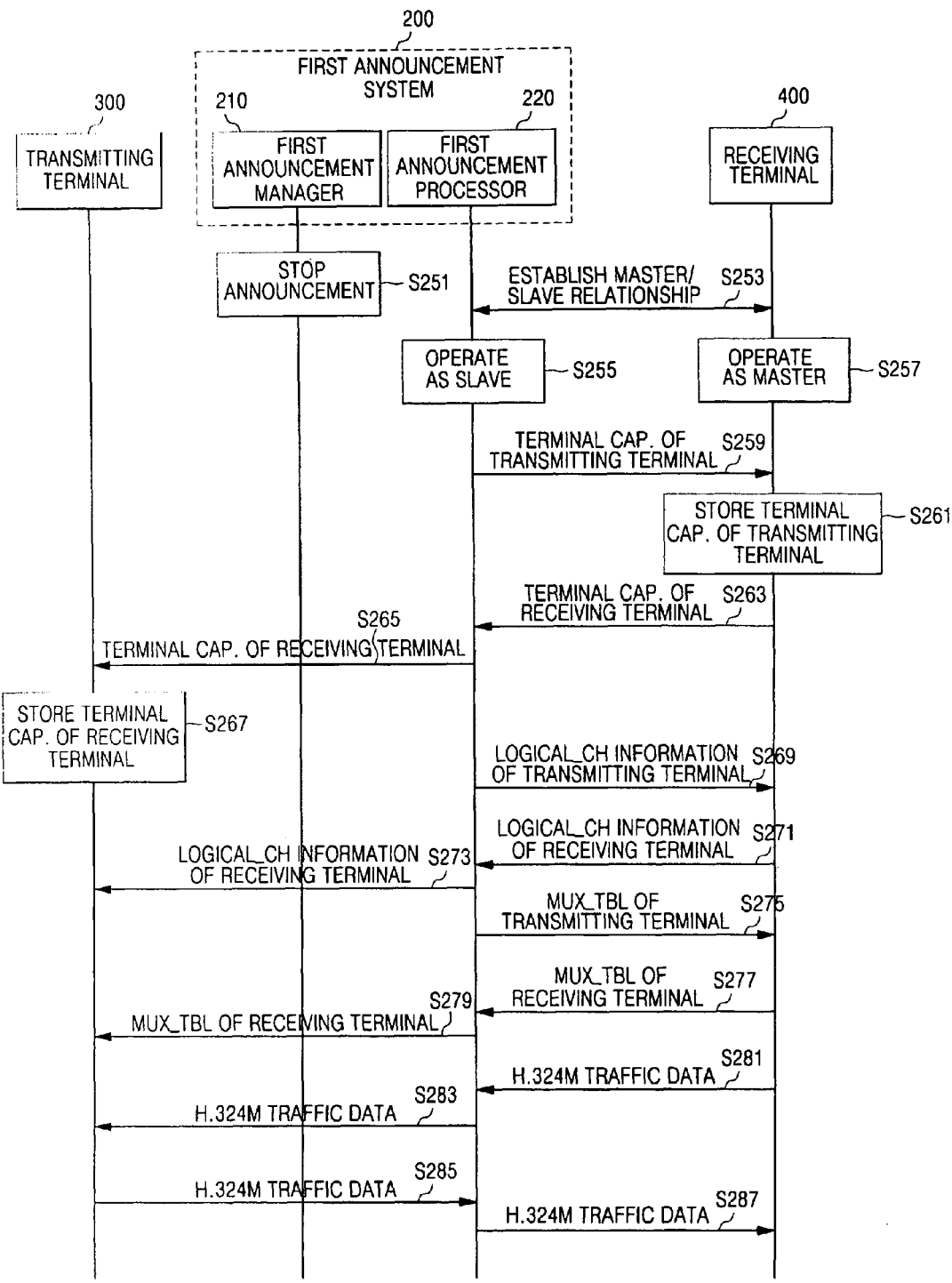

FIGS. 3 and 4 are views illustrating a multimedia tone/announcement process of an announcement system in accordance with a first exemplary embodiment of the present invention. FIG. 3 illustrates an H.324M initialization procedure performed between the first announcement system 200 and the transmitting terminal 300 in response to the RBT/CRBT/ANM request of the switch, and FIG. 4 illustrates a relay procedure performed by the first announcement system 200 between the transmitting terminal 300 and the receiving terminal 400 in response to the RBT/CRBT/ANM request of the switch.

Referring to FIG. 3, the first announcement manager 210 receiving the RBT/CRBT/ANM request from the switch generates a first announcement processor 220 (for example, an H.324M stack) (not shown) necessary to process tasks to provide the transmitting terminal with the RBT/CRBT/ANM.

Then, the first announcement processor 220 performs a process for establishing a master/slave relationship with the transmitting terminal 300 in order to perform the H.324M initialization between the first announcement system 200 and the transmitting terminal 300 (S201). At this time, by establishing a terminal type of the first announcement processor 220 to exceed the value 127, the transmitting terminal 300 operates as a slave (S203), and the first announcement processor 220 operates as a master (S205).

When the master/slave relationship is established between the transmitting terminal 300 and the first announcement processor 220, the first announcement processor 220 transmits a message including a terminal capability of the first announcement processor 220 (H.245 terminal capability set message) to the transmitting terminal 300 (S207). Further, the first announcement processor 220 receives a message including a terminal capability of the transmitting terminal 300 (H.235 terminal capability set message) from the transmitting terminal 300 (S209), and stores the terminal capability of the transmitting terminal 300 (S211) for the purpose of relaying the H.324M initialization between the transmitting terminal 300 and the receiving terminal 400 in the future.

Meanwhile, the first announcement processor 220 performs an H.245 logical channel signaling process (S213 to S215) in order to establish a logical channel (Logical_Ch) with the transmitting terminal 300. That is, the first announcement processor 220 and the first transmitting terminal 300 exchange logical channel (Logical_Ch) information with each other (S213), so that a logical channel is opened between the first announcement processor 220 and the first transmitting terminal 300 (S215).

Further, the first announcement processor 220 and the transmitting terminal 300 exchange multiplex table (Mux_Tbl) information with each other on the basis of the logical channel information exchanged in the process of S215. That is, they exchanges information on the Mux_Tbl including the multiplexing information for H.223 packets.

The first announcement processor 220 stores the Mux_Tbl of the transmitting terminal 300 transmitted from the transmitting terminal 300 in the process of S217 (S219).

When the H.324 initialization is completed between the first announcement system 200 and the transmitting terminal 300 through the processes of S201 to S219, the first announcement manager 210 provides the transmitting terminal 300 with the RBT/ANM through the announcement processor 220 (S221 and S223).

Meanwhile, when receiving an RBT/ANM stop request from the switch due to call establishment between the transmitting terminal 300 and the receiving terminal 400, etc., the first announcement system 200 stops the RBT/ANM and at the same time performs a relay between the transmitting terminal 300 and the receiving terminal 400. This process is illustrated in FIG. 4.

Referring to FIGS. 3 and 4, the first announcement manager 210 of the first announcement system 200 receiving the RBT/ANM stop request from the switch stops the RBT/ANM in response to the request (S251), and generates one more stack (H.324M stack) for interfacing with the receiving terminal 400 (not shown). FIG. 4 illustrates an example in which a stack for interfacing with the transmitting terminal 300 and a stack for interfacing with the receiving terminal 400 are included in the first announcement processor 220, as described with reference to FIG. 2.

The first announcement processor 220 performs a process to establish a master/slave relationship with the receiving terminal 400 (S253). At this time, the first announcement processor 220 maintains the state of the transmitting terminal 300 since its role is to perform a relay between the transmitting terminal 300 and the receiving terminal 400. The transmitting terminal 300 operates as a slave in the process of S203. Accordingly, the first announcement processor 220 establishes a terminal type of the first announcement processor 220 not to exceed the value 127. Then, the first announcement system 200 operates as the slave (S255) and the receiving terminal 400 operates as the master (S257).

When the master/slave relationship is established between the receiving terminal 400 and the first announcement processor 220, the first announcement processor 220 transfers the terminal capability of the transmitting terminal 300 stored in the process of S211 to the receiving terminal 400 (S259).

Meanwhile, the receiving terminal 400 which has received the terminal capability of the transmitting terminal 300 in the process of S259 stores the capability of the transmitting terminal 300 (S261), and transfers the terminal capability of the receiving terminal 400 to the first announcement processor 220 (S263).

Then, the first announcement processor 220 transfers the terminal capability of the receiving terminal 400 received from the receiving terminal 400 to the transmitting terminal 300 (S265), and the transmitting terminal 300 stores the terminal capability of the receiving terminal 400 (S267).

Further, the first announcement processor 220 obtains logical channel information of the transmitting terminal 300 over the logical channel established with the transmitting terminal 300 in the processes of S213 to S215, and transfers the logical channel information of the transmitting terminal 300 to the receiving terminal 400 (S269). That is, the logical channel that the transmitting terminal 300 opens in the processes of S213 to S215 is opened to the receiving terminal 400.

Further, the first announcement processor 220 receives the logical channel information of the receiving terminal 400 from the receiving terminal 400 and then transfers the channel information to the transmitting terminal 300 (S273).

Meanwhile, the Mux_Tbl of the transmitting terminal 300 stored in the process of S219 is transferred to the receiving terminal 400 (S275), and the Mux_Tbl of the receiving terminal 400 is received from the receiving terminal 400 and then transferred to the transmitting terminal 300 (S279).

In the processes of S259 to S279, the first announcement system 200 relays initialization information (for example, terminal capability, logical channel (Logical_Ch) information, Mux_Tbl) of the transmitting terminal 300 and the receiving terminal 400 between the transmitting terminal 300 and the receiving terminal 400.

Further, when a channel is established between the transmitting terminal 300 and the receiving terminal 400 through the first announcement system 200 by exchanging the initialization information, the first announcement system 200 forms a master/slave relationship between the transmitting terminal 300 and the receiving terminal 400 and then transfers traffic data between the transmitting terminal 300 and the receiving terminal 400 over the formed channel. For example, the first announcement system 200 receives H.324M traffic data from the receiving terminal 400 (S281) and then transfers the data to the transmitting terminal 300 (S283), and receives the H.324M traffic data from the transmitting terminal 300 (S285) and then transfers the data to the receiving terminal 400 (S287). That is, the first announcement system 200 relays the traffic data between the transmitting terminal 300 and the receiving terminal 400.

Meanwhile, when the master/slave relationship is established between the transmitting terminal 300 and the receiving terminal 400, the transmitting terminal 300 usually becomes the master, although this is not necessarily so in all cases.

Figure 5:
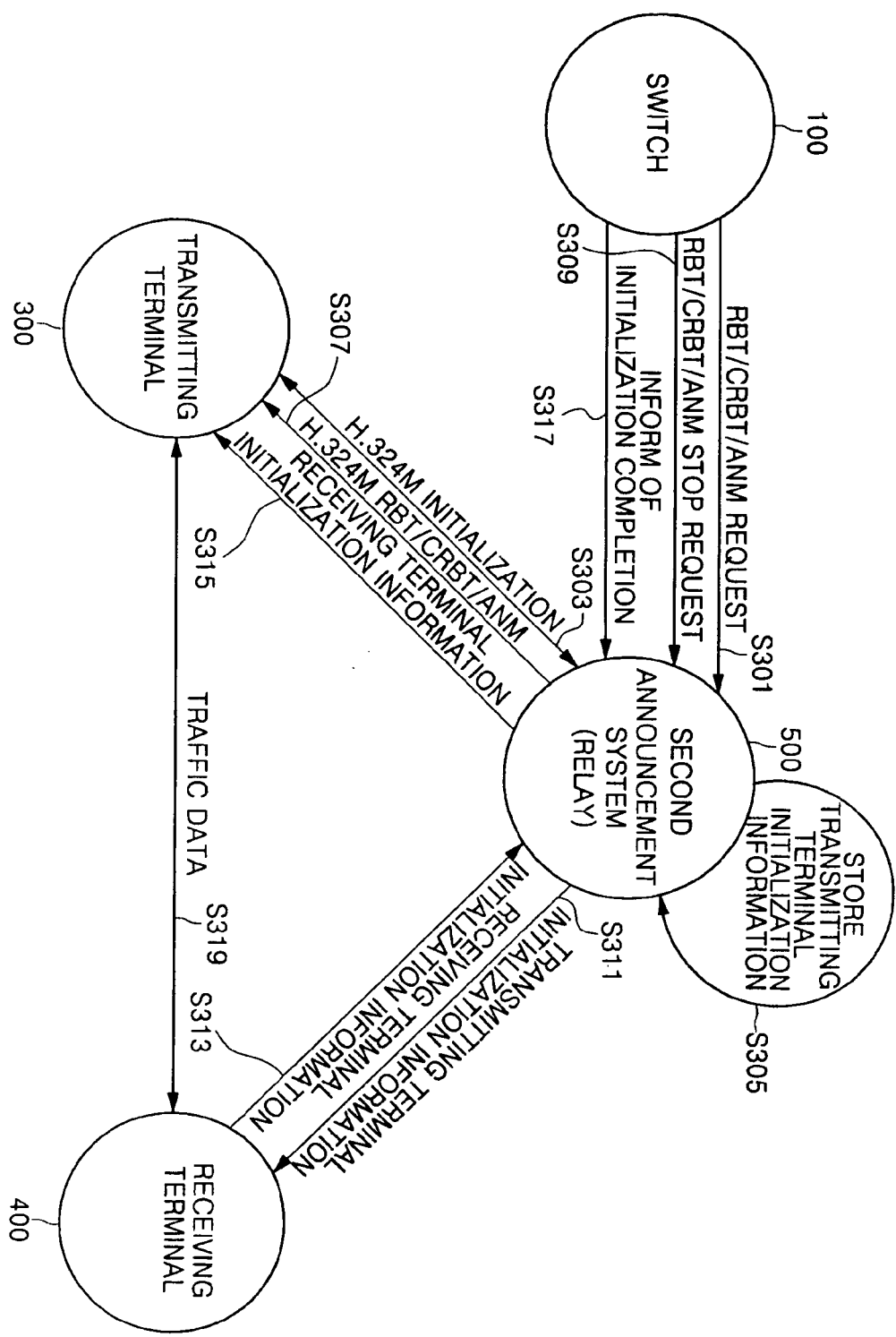
FIG. 5 illustrates an operation concept of an announcement system in accordance with a second exemplary embodiment of the present invention.

FIG. 5 illustrates an operation concept of an announcement system in accordance with a second exemplary embodiment of the present invention. Referring to FIG. 5, an announcement system (hereinafter referred to as a "second announcement system") 500 in accordance with the second exemplary embodiment of the present invention initiates or terminates an RBT/CRBT/ANM in response to the switch 100, and relays an initialization between the transmitting terminal 300 and the receiving terminal 400 when the RBT/CRBT/ANM is terminated.

In FIG. 5, processes of S301 to S315 performed among the switch 100, the second announcement system 500, the transmitting terminal 300, and the receiving terminal 400 are similar to the processes of S101 to S115 illustrated in FIG. 1. Accordingly, a detailed description of the processes of S301 to S315 is omitted.

When the initialization is completed between the transmitting terminal 300 and the receiving terminal 400 through the second announcement system 500 as a result of performing the processes of S301 to S315, the second announcement system 500 informs the switch 100 that the initialization has been completed (S317). When the switch 100 is informed that the initialization has been completed, it deletes a call leg connected to the second announcement system 500 and switches the transmitting terminal 300 and the receiving terminal 400 to be connected directly, so that traffic data can be transmitted and received directly between the transmitting terminal 300 and the receiving terminal 400 (S319).

That is, the second announcement system 500 of the present invention relays not the traffic data but H.324M initialization between the transmitting terminal 300 and the receiving terminal 400.

In an exemplary implementation of the second announcement system 500 of the present invention as well, temporary storage areas (for example, stack, etc.) for storing information (for example, initialization information, traffic data, etc.) are included in all terminals and information to be relayed is stored in the areas.

Figure 6:
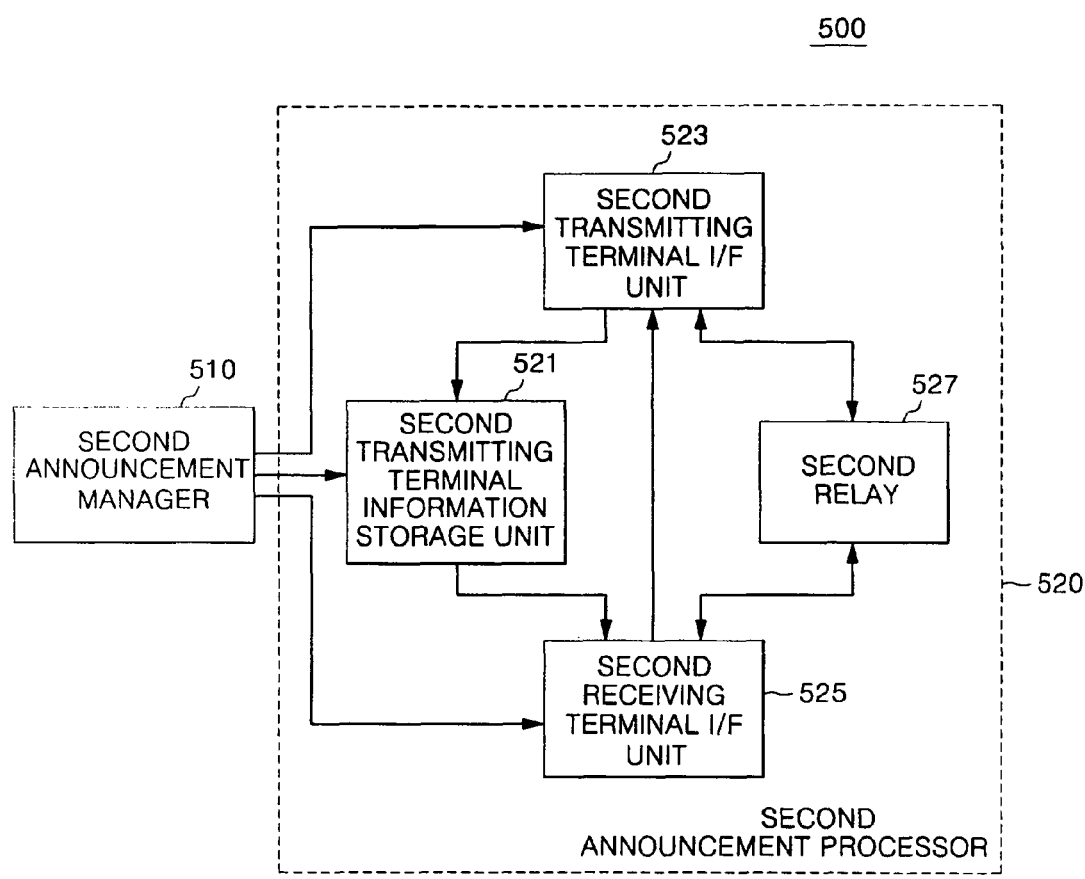
FIG. 6 is a schematic block diagram of an announcement system in accordance with a second exemplary embodiment of the present invention.

FIG. 6 is a schematic block diagram of an announcement system in accordance with a second exemplary embodiment of the present invention. Referring to FIG. 6, the second announcement system 500 includes a second announcement manager 510 and a second announcement processor 520.

The second announcement system 500 has a similar configuration to the first announcement system 200 illustrated in FIG. 2. That is, the second announcement manager 510 and the second announcement processor 520 of the second announcement system 500 are similar to the first announcement manager 210 and the first announcement processor 220 of the first announcement system 200, respectively. Further, elements of the second announcement processor 520 (a second transmitting terminal information storage unit 521, a second transmitting terminal I/F unit 523, a second receiving terminal I/F unit 525, and a second relay 527) are similar to the elements of the first announcement processor 220 (the first transmitting terminal storage unit 221, the first transmitting terminal I/F unit 223, the first receiving terminal I/F unit 225, and the first relay 227) in terms of configuration and operation.

However, the second relay 527 has a somewhat different function than the first relay 227 of the first announcement system 200 illustrated in FIG. 2. That is, while the first relay 227 relays information (initialization information and traffic data) to be exchanged between the transmitting terminal and the receiving terminal between the transmitting terminal I/F unit 223 and the receiving terminal I/F unit 225, the second relay 527 relays only the initialization information necessary for H.324M initialization between the transmitting terminal and the receiving terminal. This is the reason why the traffic data is directly transferred between the transmitting terminal and the receiving terminal according to the switching function of the switch in the second exemplary embodiment of the present invention.

Figure 7:
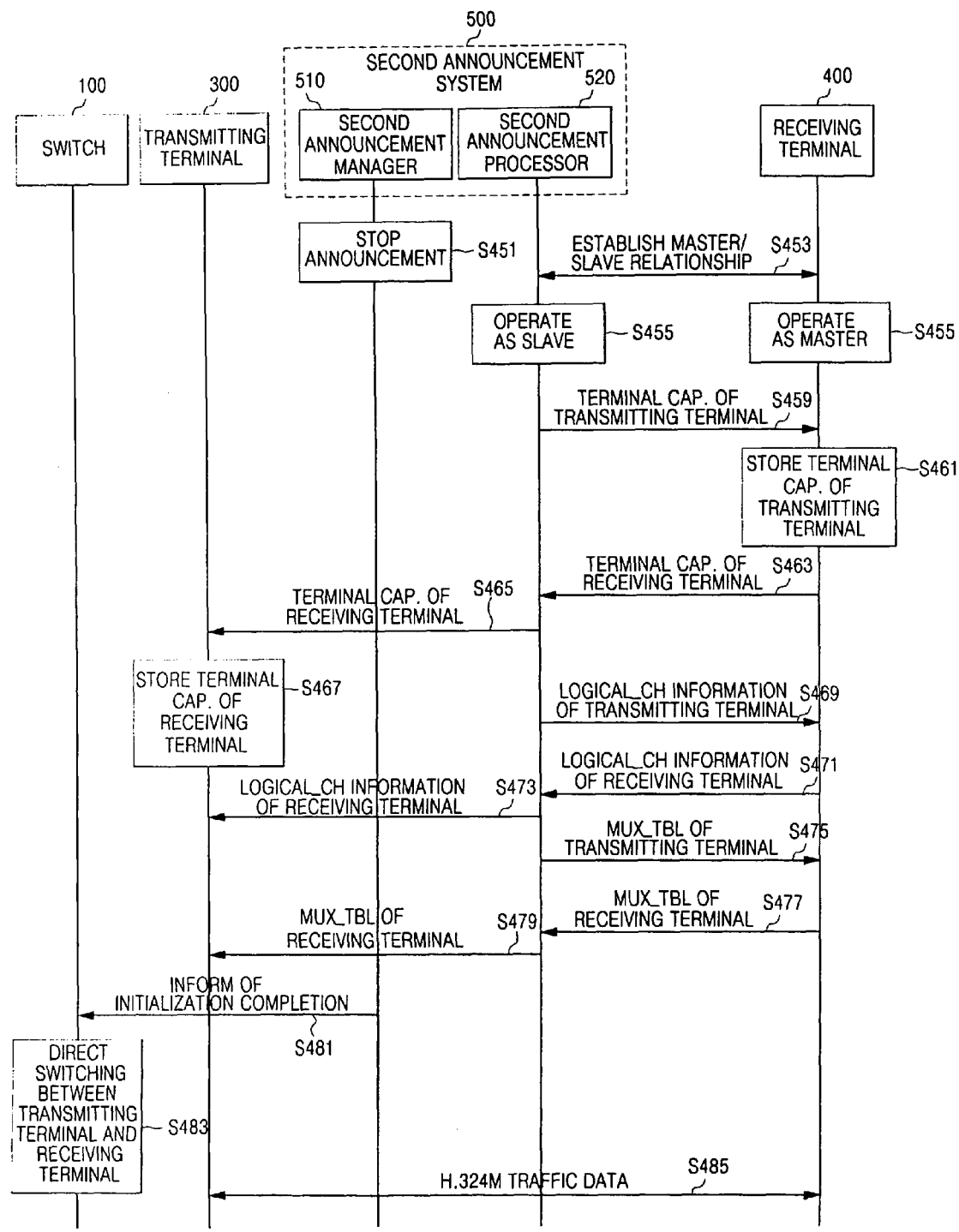
FIG. 7 shows a procedure illustrating a multimedia tone/announcement process of an announcement system in accordance with a second exemplary embodiment of the present invention.

FIG. 7 illustrates a multimedia tone/announcement process of an announcement system in accordance with a second exemplary embodiment of the present invention. In the case of using the second announcement system 500 in accordance with the second exemplary embodiment of the present invention, an H.324M initialization process of the transmitting terminal 300 performed in order to provide the RBT/CRBT/ANM is similar to the initialization process performed in the case of using the first announcement system 200. Accordingly, the H.324M initialization process between the second announcement system 500 and the transmitting terminal 300 can be understood by referring to FIG. 3 and its description. FIG. 7 shows a process of performing a relay function between the transmitting terminal 300 and the receiving terminal 400 in response to the RBT/CRBT/ANM stop request from the switch while the second announcement system 500 performs the H.324M initialization with the transmitting terminal 300 and provides the transmitting terminal 300 with the RBT/CRBT/ANM according to a procedure similar to that illustrated in FIG. 3.

Referring to FIGS. 3 and 7, the second announcement manager 510 of the second announcement system 500 receiving the RBT/ANM stop request from the switch stops the RT/ANM in response to the request (S451), and generates one more stack (H.324M stack) to interface with the receiving terminal 400 (not shown). FIG. 7 explains the case where a stack to interface with the transmitting terminal 300 and another stack to interface with the receiving terminal 400 are included in the second announcement processor 520.

The second announcement processor 520 performs a procedure to establish a master/slave relationship with the receiving terminal 400 (S453). Here, since the second announcement processor 520 performs a relay between the transmitting terminal 300 and the receiving terminal 400, it maintains the state of the transmitting terminal 300. The transmitting terminal 300 operates as a slave in the process of S203 in FIG. 3. Accordingly, in the process of S453, the second announcement processor 520 establishes a terminal type of the second announcement processor 520 not to exceed the value 127. Then the second announcement system 500 operates as a slave (S455) and the receiving terminal 400 operates as a master (S457).

When the master/slave relationship was established between the receiving terminal 400 and the second announcement processor 520, the second announcement processor 520 transfers the terminal capability of the transmitting 300 stored in the process of S211 in FIG. 3 to the receiving terminal 400 (S459).

Meanwhile, the receiving terminal 400 that has received the terminal capability of the transmitting terminal 300 through the process of S459 stores the capability of the transmitting terminal 300 (S461) and then transfers the terminal capability of the receiving terminal 400 to the second announcement processor 520 (S463).

Then, the second announcement processor 520 transfers the terminal capability of the receiving terminal 400 received from the receiving terminal 400 to the transmitting terminal 300 (S465). The transmitting terminal 300 stores the received terminal capability of the receiving terminal 400 (S467).

Further, the second announcement processor 520 obtains logical channel information of the transmitting terminal 300 over the logical channel established with the transmitting terminal 300 in the process of S213 to S215 in FIG. 3 and transfers the logical channel information of the transmitting terminal 300 to the receiving terminal 400 (S469). That is, the logical channel that was opened by the transmitting terminal 300 in the process of S213 to S215 in FIG. 3 is opened to the receiving terminal 400.

Further, the second announcement processor 520 receives the logical channel information of the receiving terminal 400 from the receiving terminal 400 (S471) and then transfers the information to the transmitting terminal 300 (S473).

Meanwhile, the second announcement processor 520 transfers the Mux_Tbl of the transmitting terminal 300 stored in the process of S219 in FIG. 3 to the receiving terminal 400, receives the Mux_Tbl of the receiving terminal 400 from the receiving terminal 400, and transfers the Mux_Tbl to the transmitting terminal 300 (S479).

In the processes of S459 to S479, the second announcement system 500 relays initialization information (for example, terminal capability, logical channel (Logical_Ch) information, Mux_Tbl) of the transmitting terminal 300 and the receiving terminal 400 between the transmitting terminal 300 and the receiving terminal 400.

Further, when initialization is completed between the transmitting terminal 300 and the receiving terminal 400 through the second announcement system 500, the second announcement system 500 informs the switch 100 that the initialization has been completed (S481).

Accordingly, when the switch 100 is informed that the initialization has been completed, it deletes the call leg connected to the second announcement system 500, performs switching to connect the transmitting terminal 300 and the receiving terminal 400 directly (S483), and enables the traffic data to be transmitted and received directly between the transmitting terminal 300 and the receiving terminal 400 (S485).

Figure 8:
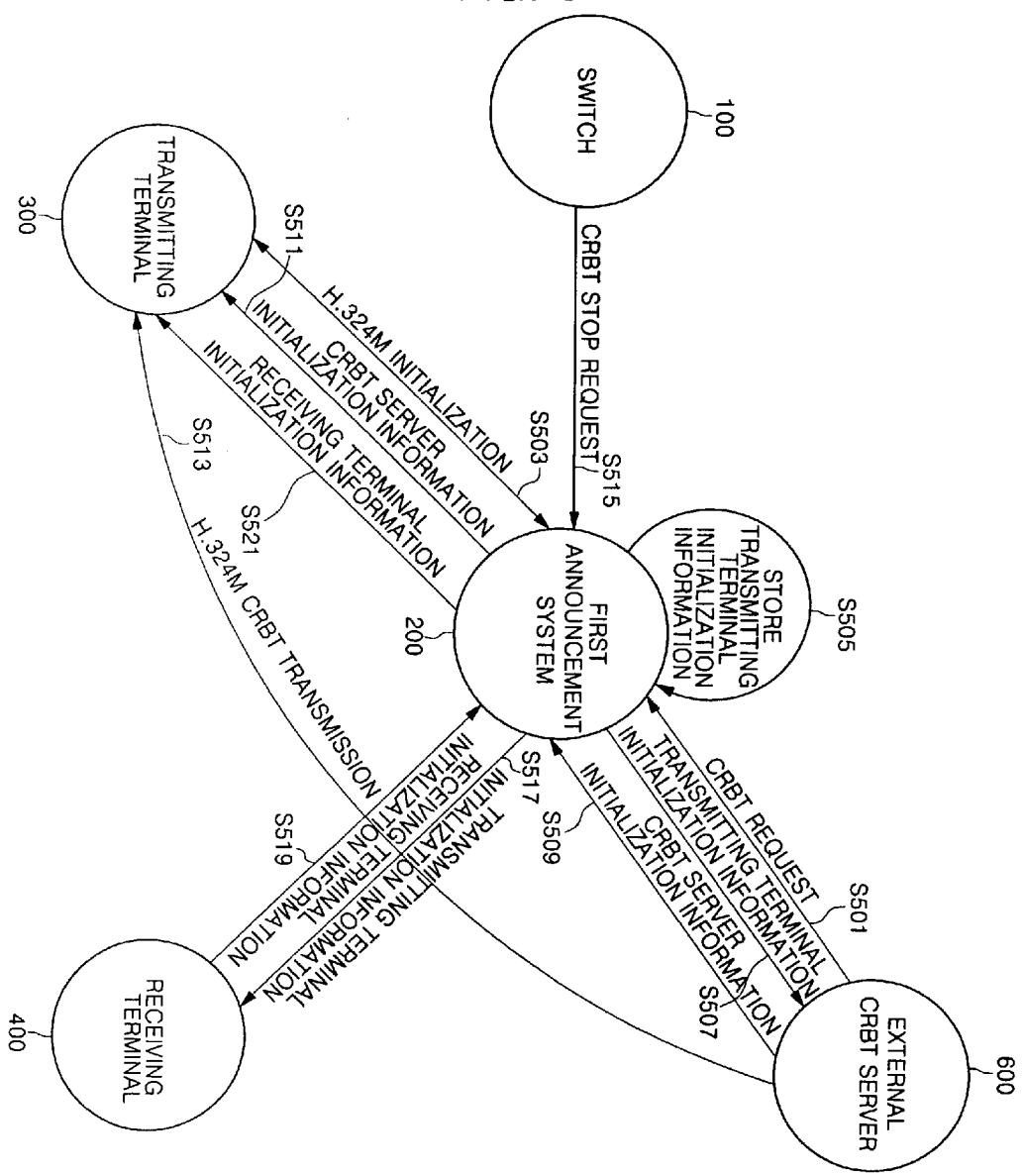
FIG. 8 illustrates an operation concept of an announcement system in accordance with a third exemplary embodiment of the present invention.

FIG. 8 illustrates an operation concept of an announcement system in accordance with a third exemplary embodiment of the present invention. FIG. 8 shows a operation concept a first announcement system 200 to process a CBRT request when the first announcement system 200 receives the CRBT request from an external CRBT server. That is, FIG. 8 illustrates a procedure of the first announcement system 200 when it receives the CRBT request from an external CRBT server 600 and a CRBT stop request from the switch 100.

Referring to FIG. 8, the first announcement system 200 receives the CRBT request from the external CRBT server 600 which has determined that the CRBT should be transmitted to the transmitting terminal 300 (S501), and performs the H.324M initialization process with the transmitting terminal 300 to provide the transmitting terminal 300 with the CRBT (S503).

Here, the H.324M initialization process performed between the transmitting terminal 300 and the first announcement system 200 is implemented according to a procedure defined in the H.324M standard, as mentioned with reference to FIG. 1. However, an exemplary implementation of the present invention further includes a process to store initialization information of the transmitting terminal 300 (S505) while the first announcement system 200 performs the process of S503. The additional process will be referred to when the first announcement system 200 relays initialization between the transmitting terminal 300 and the external CRBT server 600 and between the transmitting terminal 300 and the receiving terminal 400. Here, the initialization information of the transmitting terminal 300 includes capability of the transmitting terminal 300, muxing information (for example, video/voice codec information, muxing scheme, etc.), muxing capability, and a muxing table, for example.

When the H.324M initialization is completed between the transmitting terminal 300 and the first announcement system 200 in the process of S503, the first announcement system 200 transfers the initialization information of the transmitting terminal 300 stored in the process of S503 to the external CRBT server 600 in order to relay the initialization between the external CRBT server 600 and the transmitting terminal 300 (S507). Further, the first announcement system 200 receives the CRBT server initialization information from the external CRBT server 600 (S509), and transfers the information to the transmitting terminal 300 (S511). When the H.324M initialization is completed between the transmitting terminal 300 and the external CRBT server 600 through the processes of S507 to S511, the external CRBT server 600 transmits the H.324M CRBT to the transmitting terminal 300 on the basis of the initialization information (S513).

Meanwhile, when the switch 100 decides to stop the CRBT since call establishment is completed between the transmitting terminal 300 and the receiving terminal 400, on the basis of the call request of the transmitting terminal 300, the switch 100 requests the first announcement system 200 to stop the CRBT (S515). Then, the first announcement system 200 transfers the initialization information of the transmitting terminal 300 stored in advance to the receiving terminal 400 while stopping the CRBT (S517), receives the initialization information of the receiving terminal 400 from the receiving terminal 400 (S519), and transfers the information to the transmitting terminal (S5212). That is, according to an exemplary implementation, the first announcement system 200 relays the initialization information of the transmitting terminal 300 and the external CRBT server 600 between the transmitting terminal 300 and the external CRBT server 600, and the initialization information of the transmitting terminal 300 and the receiving terminal 400 between the transmitting terminal 300 and the receiving terminal 400.

As described above, according to the present invention, since it is possible to connect a multiple call leg by the relay, even in a wireless network based on the H.324M standard, a variety of multimedia services (for example, multimedia RBT/announcement service, video conferencing, etc.) can be provided along with a video phone service based on the H.324M.

While the present invention has been described with reference to exemplary embodiments thereof, it will be understood by those skilled in the art that various changes in form and details may be made therein without departing from the spirit and scope of the present invention as defined in the appended claims. For example, although a process where the RBT/ANM is provided to the transmitting terminal and information is transmitted between the transmitting terminal and the receiving terminal when the RBT/ANM is terminated is described above, the terminal provided with the RBT/ANM is not limited to the transmitting terminal, and the information transfer relay is not limited to between the transmitting terminal and the receiving terminal.

As described above, the present invention has the effect of enabling a multiple call leg function based on the H.324M to be processed in a circuit switched wireless network by relaying the H.324M initialization between the H.324M terminals in the circuit switched wireless network. Therefore, the present invention has the advantage of enabling a variety of multimedia services (for example, multimedia RBT/announcement service, video conferencing, etc.) to be provided along with a video phone service based on the H.324M in the circuit switched wireless network. This is conducive to popularization of the video phone and realization of additional profits based on the provision of a variety of additional multimedia services.

What is claimed is:

1. A method for providing a tone/announcement over a circuit switched wireless network, the method comprising the steps of:
   receiving a multimedia tone/announcement request message from a switch which determines whether to transmit the tone/announcement to a first terminal using a circuit switched wireless network;
   performing an initialization to open a channel between the first terminal and a server for providing a multimedia tone/announcement in response to the multimedia tone/announcement request;
   storing initialization information of the first terminal in the server for providing the multimedia tone/announcement;
   providing the first terminal with the multimedia tone/announcement;
   receiving a multimedia tone/announcement stop request message from the switch;
   stopping the multimedia tone/announcement in response to the multimedia tone/announcement stop request; and
   relaying the initialization information between the first terminal and a second terminal using the initialization information of the first terminal stored in advance in the server for providing the multimedia tone/announcement;
   wherein the stored initialization information comprises at least one of a terminal capability of the first terminal, multiplex information, a multiplex capability, and logical channel information.

2. The method according to claim 1, wherein the first terminal comprises a transmission terminal.

3. The method according to claim 1, wherein the second terminal comprises a receiving terminal.

4. The method according to claim 1, wherein the step of performing the initialization to open a channel between the first terminal and a server is performed on the basis of H.324M standard.

5. The method according to claim 1, wherein the relaying step comprises:
   transferring the initialization information of the first terminal stored in advance in the server for providing the multimedia tone/announcement to the second terminal; and
   receiving, at the server, the initialization information of the second terminal from the second terminal, and then transmitting the initialization information of the second terminal to the first terminal, for providing the multimedia tone/announcement.

6. The method according to claim 5, wherein the received and transmitted initialization information of the second terminal comprises at least one of a terminal capability of the first terminal, multiplex information, a multiplex capability, and logical channel information.

7. The method according to claim 1, further comprising, when a logical channel is formed between the first terminal and the second terminal through the sever for providing the multimedia tone/announcement as a result of relaying, at the server for providing the multimedia tone/announcement, transferring traffic data between the first terminal and the second terminal.

8. The method according to claim 1, further comprising the steps of:
   at the server for providing the tone/announcement, informing the switch that the step of relaying the initialization information between the first terminal and the second terminal has been completed when said step of relaying has been completed;
   at the switch, deleting a call leg connected to the server for providing the multimedia tone/announcement and performing a switching to directly connect the first and second terminals; and
   transmitting and receiving traffic data between the first and second terminals using the switching by the switch.

9. The method according to claim 1, wherein receiving the multimedia tone/announcement request message from the switch comprises:
   receiving the multimedia tone/announcement request message from an external server which has determined that the tone/announcement should be transmitted to the first terminal;
   performing an initialization to communicate between the first terminal and the server for providing the multimedia tone/announcement in response to the multimedia tone/announcement;
   storing the initialization information of the first terminal in the server for providing the multimedia tone/announcement;
   relaying the initialization information between the first terminal and the external server using the initialization information of the first terminal stored in advance in the server for providing the multimedia tone/announcement; and when a logical channel is formed between the first terminal and the external server through the server for providing the multimedia tone/announcement as a result of the relaying of the initialization information between the first terminal and the external server, providing, at the external server, the first terminal with the multimedia tone/announcement using the logical channel.

10. A system for providing a tone/announcement over a circuit switched wireless network, the system comprising:

an announcement manager for receiving a multimedia tone/announcement request message and a multimedia tone/announcement stop request message from a switch which determines whether to transmit the tone/announcement to a first terminal using the circuit switched wireless network, and controlling the system to transmit the multimedia tone/announcement according to the received message; and an announcement processor for performing an initialization between the first terminal and the system by controlling the announcement manager, and relaying information to be transferred between the first terminal and a second terminal using the circuit switched wireless network service.

11. The system according to claim 10, wherein the first terminal comprises a transmission terminal.

12. The system according to claim 10, wherein the second terminal comprises a receiving terminal 13. The system according to claim 10, wherein the announcement manager generates a multimedia tone/announcement initiation command in response to reception of the multimedia tone/announcement request message, and generates a multimedia tone/announcement termination command in response to reception of the multimedia tone/announcement stop request message.

14. The system according to claim 13, wherein the announcement processor generates the commands in response to a multimedia tone/announcement initiation command of the announcement manager.

15. The system according to claim 14, wherein the announcement processor comprises:

an initialization information storage unit for storing initialization information of the first terminal;

a first terminal interface for interfacing with the first terminal;

a second terminal interface for interfacing with the second terminal; and a relay for relaying information to be exchanged between the first and second terminal between the first terminal interface and second terminal interface.

16. The system according to claim 15, wherein the first terminal information storage unit and the first terminal interface are configured as a stack corresponding to the first terminal.

17. The system according to claim 16, wherein the stack is a H.324M stack.

18. The system according to claim 15, wherein the second terminal interface is configured as a stack corresponding to the second terminal.

19. The system according to claim 18, wherein the stack is a H.324M stack.

20. The system according to claim 15, wherein the relay relays only initialization information to perform channel connection between the first and second terminals.

21. The system according to claim 15, wherein the relay relays both the initialization information to perform channel connection between the first and second terminals, and traffic data.

* * * * *